United States Patent [19]
Saxena et al.

[11] Patent Number: 5,985,223
[45] Date of Patent: *Nov. 16, 1999

[54] REMOVAL OF NOX AND SOX EMISSIONS FORM PICKLING LINES FOR METAL TREATMENT

[75] Inventors: Neeraj Saxena, New Providence, N.J.; Robert Francis Workosky, Macungie; Mark H. Anderson, Bethlehem, both of Pa.; Shuen-Cheng Hwang, Chester, N.J.

[73] Assignee: The Boc Group, Inc., New Providence, N.J.

[*] Notice: This patent issued on a continued prosecution application filed under 37 CFR 1.53(d), and is subject to the twenty year patent term provisions of 35 U.S.C. 154(a)(2).

[21] Appl. No.: 09/089,308

[22] Filed: Jun. 2, 1998

[51] Int. Cl.⁶ .............................. B01D 53/60; C23G 1/02
[52] U.S. Cl. ............... 423/235; 423/243.01; 423/243.08; 423/395; 423/551; 423/555; 423/DIG. 2; 134/41
[58] Field of Search ............................... 134/41; 423/235, 423/243.01, 243.08, DIG. 2, 555, 551, 395

[56] References Cited

U.S. PATENT DOCUMENTS

| | | | |
|---|---|---|---|
| 4,035,470 | 7/1977 | Senjo et al. .............. | 423/235 |
| 4,119,702 | 10/1978 | Azuhata et al. .......... | 423/235 |
| 5,206,002 | 4/1993 | Skelley et al. ........... | 423/235 |
| 5,316,737 | 5/1994 | Skelley et al. ........... | 422/170 |
| 5,639,434 | 6/1997 | Patrikainen et al. ..... | 423/235 |

FOREIGN PATENT DOCUMENTS

| | | | |
|---|---|---|---|
| 1566 98 | 9/1982 | Germany ................. | 423/235 |
| 53-11164 | 2/1978 | Japan ....................... | 423/235 |
| 60-246207 | 12/1985 | Japan . | |

*Primary Examiner*—Gary P. Straub
*Assistant Examiner*—Timothy C Vanoy
*Attorney, Agent, or Firm*—Philip H. Von Neida; Salvatore P. Pace

[57] ABSTRACT

A process for the removal of a high percentage of NOx and SOx from the gaseous effluent of a metal pickling operation comprising passing the effluent through an aqueous scrubber, treating the gaseous effluent from the scrubber with ozone, passing the effluent from the ozone treatment through a second aqueous scrubber thereby removing at least 80 vol % of the NOx and SOx present in the original effluent. The scrubbing solutions in both of the scrubbers preferably have a pH of from 7 to 14, more preferably 10 to 14. The scrubbing solutions in both scrubbers are caustic solutions containing sodium hydroxide or calcium hydroxide. The NOx and SOx in the scrubbers are converted into nitrate salts and sulfate salts, which are removed from the scrubbers.

7 Claims, No Drawings

REMOVAL OF NOX AND SOX EMISSIONS FORM PICKLING LINES FOR METAL TREATMENT

TECHNICAL FIELD

The present invention is directed to the removal of noxious compounds NOx and SOx from the gaseous effluent from metal pickling operations.

BACKGROUND OF THE INVENTION

Pickling refers to the treatment of metal during processing such as shaping or size reduction, to remove scale and other metal oxides that have accumulated during storage or earlier processing. The treatment consists of exposing the metal to an aqueous bath of strong inorganic acids, typically nitric acid mixed with one or more of sulfuric acid, hydrofluoric acid or hydrochloric acid. As a result of the chemical reactions taking place in the bath, and at times due to thermal decomposition of the acid fumes therein, the atmosphere over the bath contains a high concentration of NOx and possibly SOx. The atmosphere in the pickling tanks is typically regularly purged using a mixture of dry air and nitrogen. This exhaust gas must be treated to significantly reduce NOx, SOx and acid gases before it can be vented to the atmosphere.

NOx refers to the nitrogen oxides commonly present in waste gas effluents. i.e. NO, $N_2O_3$, $NO_2$ and $N_2O_5$. These oxides, which have increasing degrees of oxidation in the order given, likewise have varying degrees of solubility/reactivity with aqueous solutions, preferably caustic solutions having a pH between 7 and 14. In general, the higher the oxidation state, the greater the solubility/reactivity with aqueous caustic solutions. It is important to bear in mind that, unlike combustion wherein large percentage of the NOx formed exists as NO, the effluent gas from a pickling operation commonly contains a much higher percentage of higher nitrogen oxides, particularly $NO_2$. As a general comparison, combustion typically produces at least about 90 vol. percent NO with the balance being $NO_2$ whereas the effluent gas from a pickling operation typically contains only from about 60 to 65 vol. percent NO with the balance $NO_2$. These considerations apply to SOx formation as well.

NOx and SOx are currently removed from pickling lines primary by alkaline scrubbing. The use of multiple scrubbings will remove about 40% to 50% by volume of the NOx and SOx in an effluent gas stream as described above. However, more efficient systems were required to meet ever-tightening NOx emission standards. One such system is a wet oxidation system that utilizes hydrogen peroxide or sodium oxychloride in the first scrubber to convert NO to $NO_2$. The second scrubber contacts $NO_2$ with a reducing agent, such as sodium hyposulfide, to convert it to nitrogen that can be vented to the atmosphere. This system suffers from high cost and the possibility of release of dangerous emissions, such $ClO_2$.

Another technology utilized to address the problem of NOx removal is selective catalytic reduction (SCR) which utilizes catalysts to reduce NOx to nitrogen gas. The problem with the use of such systems to treat pickling line effluents is that the HF and $H_2SO_4$ fumes must be initially removed, such as in a scrubber. Failure to effectively remove such acid fumes will result in the catalyst becoming plugged or inactivated by the acids. This will result in the discharge, or "slip", of hazardous substances from the system into the environment. SCR and other non-catalytic reduction technologies may also require heating the gas to an optimum temperature for optimal reduction reaction.

Still another technology for the removal of NOx is referred to as low temperature oxidation. This is, in effect, heat removal followed by an ozone-based oxidation system followed by a wet scrubber. The molar ratios utilized for a system are at minimum 1.5 moles of $O_3$ for each mole of NOx to be removed. Further, in addition to a fairly high rate of ozone consumption, this system requires a series of process steps, such as the heat exchange, which are not required for treatment of the low temperature, saturated emissions from a pickling of metals processing operation.

It would therefore be a significant advance in the art if a process could be provided that would efficiently remove NOx and SOx from gaseous effluents from metal pickling operations. Such a process is provided in accordance with the present invention.

SUMMARY OF THE INVENTION

The present invention is directed to a process of removing NOx and SOx from a gaseous effluent from a metal pickling operation comprising passing the gaseous effluent from the bath through an aqueous alkaline scrubber, treating the effluent therefrom with ozone to oxidize NO present to higher oxidation levels and again passing the effluent through an aqueous alkaline scrubber.

DETAILED DESCRIPTION OF THE INVENTION

The present invention is directed to an improvement in the removal of NOx and SOx from the gaseous effluent of a metal pickling process. In a pickling process, metal having a scale of metal oxides is contacted with pickling acids—such as HCl, $HNO_3$, $H_2SO_4$ and HF. The acid is transported to the metal surface through the outer layers of metal oxide, where it reacts to form metal salts—such as $FeCl_2$, $Fe(NO_3)_2$ and the like, and hydrogen. If the $H_2$ gas phase layer on the metal surface is thick, the pickling process is slowed down due to the increased resistance to acid transport to the metal surface. Hence, any means of lowering the gas phase resistance would speed-up the pickling rate, increasing the metal throughput. One common practice to break up the hydrogen bubble layer is by agitating the acid bath physically by bubbling air into it.

Because of the nature of the pickling process, the gaseous effluent, which is formed by sweeping the pickling tank with nitrogen or nitrogen-rich gas, preferably a mixture of nitrogen and air, is not at a high temperature as would be the case with combustion gases. The gaseous effluent contains some volatilized strong mineral acids and their decomposition products, and contains a significantly higher concentration of NOx and SOx than found in combustion gases. For these reasons, although there is a considerable breadth of technology concerning NOx and SOx removal, there has heretofore not been a process which provides for the efficient, i.e. greater than 80% by volume, removal thereof from pickling process gas effluent.

The first step in the process of the present invention is to pass the gaseous effluent from the pickling bath through an aqueous alkaline scrubber. The pH of the scrubber must be between 7 and 14, but is preferably very basic, i.e. between pH 10 and 14. It is important to note that it is not necessary to prepare the gaseous effluent in any way prior to admitting it to the scrubber, such as by passing it through a heat exchanger, since it is typically not at a significantly elevated temperature in comparison to typical combustion off-gases. A typical pickling gaseous effluent will contain from about 1,000 to 10,000 ppm NOx by volume. The scrubber is contained in a suitable corrosion-resistant container. The effluent is generally admitted to the bottom of the scrubber and allowed to flow upward through and react with the aqueous scrubber solution.

The particular configuration of the scrubber is not criterial to the invention so long as it affords a means of causing sufficient contact between the aqueous solution and the effluent to have a good percentage of the NOx and SOx present dissolve into the solution. For instance, a vertical counter current packed or tray column, or a horizontal aqueous spray chamber can be used. In general, a residence time between about 2 and 20 seconds in the scrubber is adequate contact for the scrubber to remove a good portion of the impurities present therein. Those of ordinary skill in the art will appreciate that aqueous scrubbers as described here must be equipped with means to withdraw a portion of the scrubber solution periodically and either replace it with fresh solution or clean it of impurities and return it to the scrubber.

In the scrubber, the scrubbing solution reacts primarily with the higher forms of NOx present in the effluent. This means, for example, that $NO_2$ as well as any $N_2O_3$ and $N_2O_5$ present will be converted to HNO or $NaNO_3$. Acid products formed can be removed to a conventional acid waste treatment plant or recycled to the pickling bath. The aqueous alkaline scrubber may contain sodium hydroxide or calcium hydroxide, for example, and the salt products formed, e.g. $NaNO_3$ or $CaSO_4$, can be concentrated and discarded as solid/liquid conventional waste. The alkaline solution also neutralizes any acid, i.e. HF and $HNO_3$, that may have been carried out of the pickling tank. This is obviously important since it can be very detrimental for such free acids to pass beyond the initial stage of treatment.

The gaseous affluent from the initial scrubber now contains NOx and SOx primarily in their lower oxidation state, i.e. NO and $SO_2$. The effluent is passed to a conventional ozone treatment apparatus that can take any configuration recognized by those of ordinary skill in the art. In general, the apparatus can comprise a passage, e.g. a conduit, to the subsequent step of sufficient length to permit thorough mixing of gases and reaction between the effluent and ozone so that the low oxidation state compounds are oxidized to a higher oxidation state.

The ozone is generated by passing oxygen or air through a conventional generator and introduced into the ozone treatment zone at or soon after the point where the effluent withdrawn from the scrubber is introduced into the treatment zone. In general, it is preferred to equip the ozone treatment zone with a conventional analyzer device that measures the NOx content of the effluent exiting the scrubber and adjusts the ozone content in the incoming ozone mixture, i.e. by controlling the production of ozone, or its flow rate as necessary to provide the correct concentration for the NOx content in the effluent. A decided advantage of the process of the present invention is that, by combining the initial scrubber step with the ozone treatment and the subsequent scrubber step to be described, the amount of active reactant in all steps, i.e. the aqueous scrubber solution and ozone, respectively, is reduced in comparison to conventional usage.

The gaseous effluent from the ozone treatment is passed to a second aqueous scrubber, also preferably an aqueous alkaline solution. As above, the water dissolves the higher forms of NOx and SOx to form corresponding acids which can be recycled to an acid storage or treatment facility. Alternatively, the alkaline reacts therewith to form the corresponding neutralized salts which, as above, can be transported to a conventional waste treatment plant. Since the treatment in the ozone apparatus oxidizes lower forms of NOx to higher oxidation states and the second scrubber removes the higher oxidation states efficiently, the effluent from the second scrubber contains less than about 20 vol%, preferably less than 10 vol. %, NOx and SOx present in the original effluent. The effluent can then be emitted as any conventional smoke stack discharge.

The process provided in accordance with the present invention is effective in removing at least 80% by volume of the NOx and SOx present in the metal pickling effluent utilizing only from 0.7 to 1.4, preferably from 0.9 to 1.2, moles of ozone per mole of NOx plus SOx present in the effluent. This represents an improvement in efficiency over previously known processes.

As an additional step in the improved process of the present invention, some of the ozone produced from the ozone generator is also used to agitate the acid bath. The ozone introduced can be supplemental to the air used already for this purpose, or to replace it. The ozone gas flow will provide mechanical agitation action, while the ozone present will react with the hydrogen bubbles formed during the de-scaling reaction to form water by the reaction

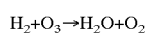

The gas bubbles provide acid agitation for enhanced pickling and de-scaling reaction by removing the hydrogen bubbles away from the metal surface and increasing the effective area over which the metal is contacted with acid. Excess ozone also reacts with the NOx and SOx fumes formed in the pickling process to form higher order, and more soluble, nitrogen and sulfur oxides, thus enhancing the efficiency of the first aqueous scrubber.

The process of the present invention can be utilized to purify the gaseous effluent stream from pickling processes with most metals, particularly the ferrous metals, and with other processes involving the use of concentrated inorganic acids, such as nitric acid, sulfuric acid and the like. In addition to the high efficiency of removal of NOx and SOx provided by the present process, it is advantageous in that it removes toxic gas phase emissions and converts them to conventional weak aqueous acids and salt solutions. The weak acids can be used in the acid plant already present at the pickling facility. The waste salts formed can be discharged to the salt solution treatment facility, which is also a conventional facility already present at the pickling plant. By the use of the first scrubber and the ozone treatment, the total oxidant consumption of the system is lowered compared to other recognized processes. Finally, since the amount of ozone utilized is carefully controlled to remain with the defined limit, the present process does not suffer from having ozone slip into the outlet gas stream.

What we claim is:

1. A process for the removal of NOx and SOx from the gaseous effluent from a metal pickling bath comprising:
   a) passing the gaseous effluent from the bath through a first aqueous alkaline scrubber to remove higher oxidation forms of NOx and SOx, and acid gasses with the formation and removal of nitrate salts and sulfate salts;
   b) treating the gaseous effluent from step a) with a gas mixture containing ozone to oxidize NOx and SOx to higher oxidation forms wherein the concentration of ozone therein is such that the molar ratio of ozone to NOx plus SOx in the effluent is from about 0.7:1 to 1.4:1; and c) passing the resultant gas mixture through a second aqueous alkaline scrubber to remove additional higher oxidation forms of NOx and SOx formed in step b) with the formation and removal of nitrate salts and sulfate salts.

2. A process in accordance to claim 1, additionally including the step of bubbling additional gas mixture containing ozone through the pickling bath to increase the pickling efficiency and to oxidize a portion of the NOx and SOx present to higher oxidation forms.

3. A process in accordance with claim 1, where the pH in both aqueous scrubbers is from about 7 to 14.

4. A process in accordance with claim 3, where the pH in both aqueous scrubbers is from about 10 to 14.

5. A process in accordance with claim 1, wherein said alkaline scrubbers contain sodium hydroxide or calcium hydroxide.

6. A process in accordance with claim 1, wherein the molar ratio of ozone to NOx plus SOx in the effluent in step b) is from about 0.9:1 to 1.2:1.

7. A process in accordance with claim 1 additionally including the step of determining the concentration of NOx and SOx in the effluent in step a), and adjusting the molar concentration of ozone in step b) in accordance with such determination.

* * * * *